United States Patent [19]

Caniglia et al.

[11] Patent Number: 4,964,531
[45] Date of Patent: Oct. 23, 1990

[54] BLADDER FOR FUEL TANK

[76] Inventors: Joseph E. Caniglia; Roberto G. Caniglia, both of 5368 E. 134th St., Garfield Heights, Ohio 44125

[21] Appl. No.: 437,675

[22] Filed: Nov. 16, 1989

[51] Int. Cl.$^5$ .............................................. B65D 90/00
[52] U.S. Cl. .................................. 220/855; 220/5 A; 220/20.5; 220/88 R; 220/470
[58] Field of Search .................... 220/855, 88 R, 20.5, 220/21, 5 A, 470, 900

[56] References Cited

U.S. PATENT DOCUMENTS

| | | |
|---|---|---|
| 514,488 | 2/1894 | Moore . |
| 1,462,347 | 7/1923 | Kramer . |
| 2,204,765 | 6/1940 | McDaniels . |
| 2,214,330 | 9/1940 | Henderson et al. . |
| 2,269,617 | 1/1942 | Borstel . |
| 2,379,126 | 6/1945 | Welden . |
| 2,417,337 | 3/1947 | Whitesell, Jr. . |
| 2,530,819 | 11/1950 | Hamlin . |
| 2,533,431 | 12/1950 | Chausson . |
| 2,703,607 | 3/1955 | Simmonds ................ 220/20.5 X |
| 2,806,622 | 9/1957 | Leifer ........................ 220/5 A |
| 2,860,809 | 11/1958 | Perry . |
| 3,069,042 | 12/1962 | Johnston ..................... 220/88 R |
| 3,349,953 | 10/1967 | Conaway et al. . |
| 3,374,916 | 3/1968 | Herff . |
| 3,400,854 | 9/1968 | Conaway et al. . |
| 3,653,531 | 4/1972 | Zurmuehlen . |
| 3,822,807 | 7/1974 | MacDonald et al. . |
| 3,905,505 | 9/1975 | Gallay . |
| 3,979,005 | 9/1976 | Robinson et al. . |
| 4,077,884 | 3/1978 | Naumann . |
| 4,294,279 | 10/1981 | Wyeth . |
| 4,613,054 | 9/1986 | Schrenk .................... 220/88 R |
| 4,750,631 | 6/1988 | Hastings et al. . |
| 4,858,778 | 8/1989 | Patrick ...................... 220/5 A |
| 4,878,591 | 11/1989 | Johnston ................. 220/88 R X |

Primary Examiner—Steven M. Pollard
Attorney, Agent, or Firm—Renner, Otto, Boisselle & Sklar

[57] ABSTRACT

A bladder for a fuel tank includes plural concentric chambers separated by respective walls for placement in a fuel tank to contain fuel in such chambers, spacers for spacing the outer walls forming the respective chambers from the inner wall of a fuel tank, a bottom wall with openings to allow filling of the respective chambers from the bottom, a cover to block flow of fuel out from the top of the chambers, vents in the cover to permit air to exit the respective chambers, and a combination seal and dike at respective vents to block fuel flow into the vents from the top and to block fuel from exiting through the vents during impact that tends to collapse the fuel tank and bladder.

10 Claims, 3 Drawing Sheets

BLADDER FOR FUEL TANK

TECHNICAL FIELD

The present invention relates generally, as is indicated, to bladder devices for fuel tanks and, more particularly, to the reduction of catastrophic leaks from a fuel tank during an impact, compression and/or rupturing of the fuel tank, for example, during a collision of that in which the fuel tank is carried, such as a vehicle or the like.

BACKGROUND

When an automobile or other vehicle has a collision, the impact sometimes causes damage to the fuel tank. If the impact is so severe as to deform the fuel tank to cause it to rupture or otherwise causes the fuel tank to rupture, fuel may leak. In most cases, it is preferred that the fuel leakage be downward toward the ground and not upward toward a part of the vehicle where a hot area, spark, or the like may ignite the fuel. Sometimes during such a collision which causes a compressive impact to the fuel tank, a rupture in the top of the fuel tank can allow fuel to be sprayed upward, which, as was noted above, often is more hazardous than would be the case if the fuel were to be sprayed or to leak in a downward direction.

Also, the sloshing of fuel in a vehicle fuel tank, as the vehicle changes attitude and/or direction, is undesirable. First of all, in ordinary operation of a vehicle, sloshing noise is disturbing. Secondly, a rupture in the side of the fuel tank during a collision and sloshing of fuel toward the rupture undesirably results in fuel spraying out through the side with some fuel spraying down and some up. Thus, it would be desirable to minimize sloshing of fuel in the tank.

A conventional bladder that forms an essentially sealed chamber in the fuel tank has the disadvantage that if it is pierced, the bladder tends no longer to function for its intended purpose. However, in accordance with the present invention, plural chambers that are not entirely sealed prevent sloshing and provide controlled discharge of fuel and are operative for intended function even in the case that one or more of the chambers tends to be deformed and/or broken.

SUMMARY

Accordingly, one aspect of the invention is to reduce the possibility of fuel spraying upward during a rupturing impact to a fuel tank.

Another aspect is to reduce sloshing of fuel in the fuel tank.

Another aspect is to improve safety of a fuel tank.

Briefly, then, a bladder for a fuel tank includes plural chambers separated by respective walls for placement in a fuel tank, spacers to space at least part of an outer wall of the bladder from an inner wall of the fuel tank, openings for filling the respective chambers from the bottom, and vents for permitting air to exit the chambers.

The invention also relates to a fuel tank system including a fuel tank and inside the fuel tank a bladder including plural chambers separated by respective walls for placement in a fuel tank, spacers to space at least part of an outer wall of the bladder from an inner wall of the fuel tank, openings for filling the respective chambers from the bottom, and vents for permitting air to exit the chambers.

Although the invention is described below with respect to a fuel tank, principles of the invention may be employed with other types of containers for holding fluids or fluid-like material. Additionally, although a preferred embodiment and best mode of the invention are described below, it will be appreciated that the scope of the invention is to be determined by the claims.

The foregoing and other objects, features and advantages of the present invention will become apparent from the following description.

To the accomplishment of the foregoing and related ends, the foregoing and other features of the invention are hereinafter more fully described and particularly pointed out in the claims, the following description and the annexed drawings setting forth in detail a certain illustrative embodiment of the invention, this being indicative, however, of but one of the various ways in which the principles of the invention may be employed.

DETAILED DESCRIPTION

Figure 1:
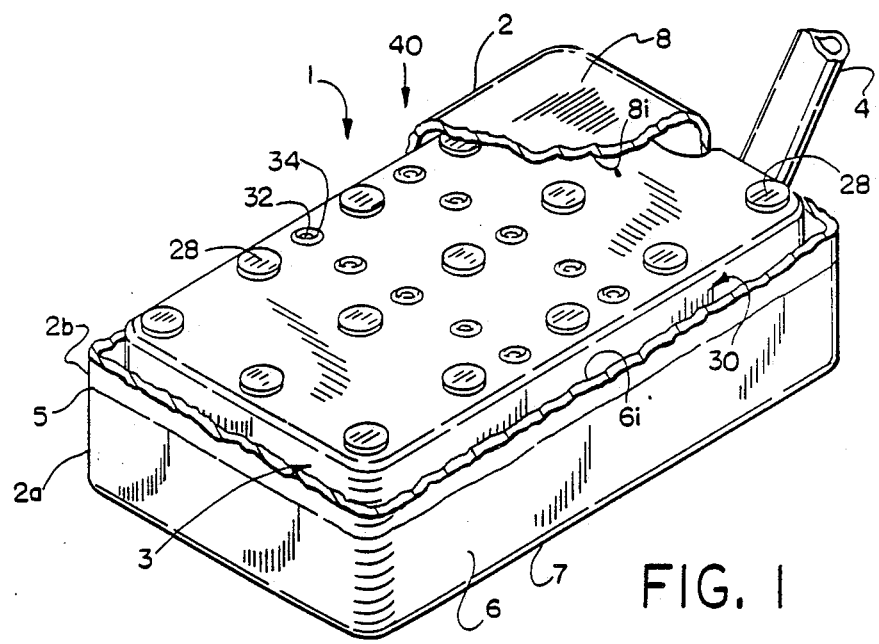
FIG. 1 is a perspective view showing a bladder in accordance with the present invention located within a fuel tank, part of the fuel tank being broken away to see the bladder therein.
Figure 2:
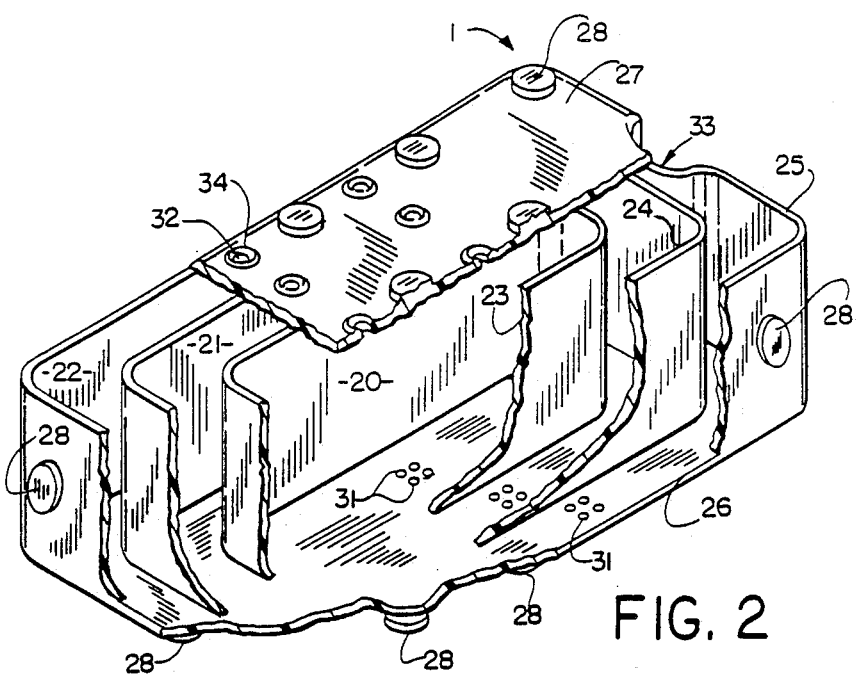
FIG. 2 is a perspective view, partly broken away, of the bladder of FIG. 1.
Figure 3:
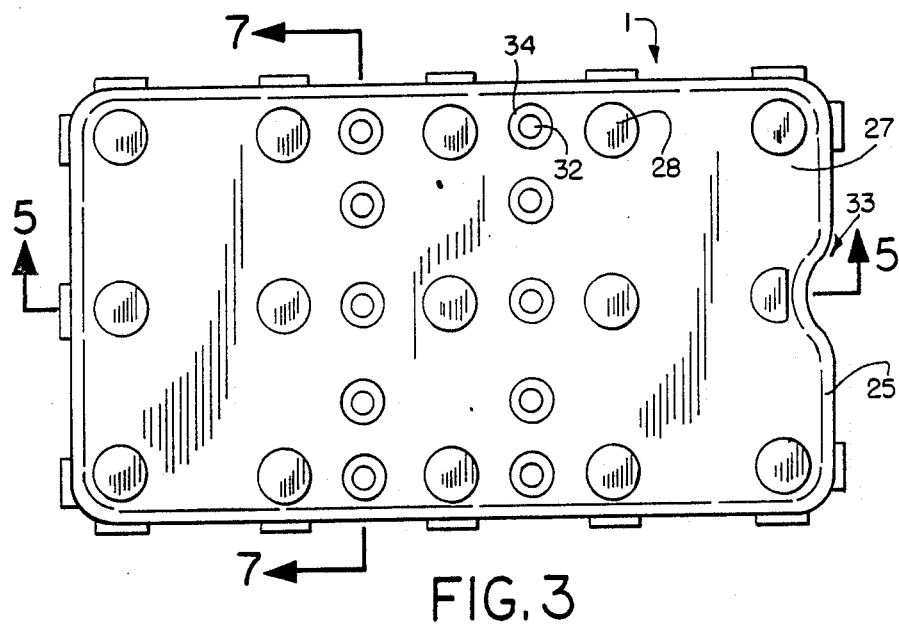
FIG. 3 is a plan view of the bladder with the top in place.
Figure 4:
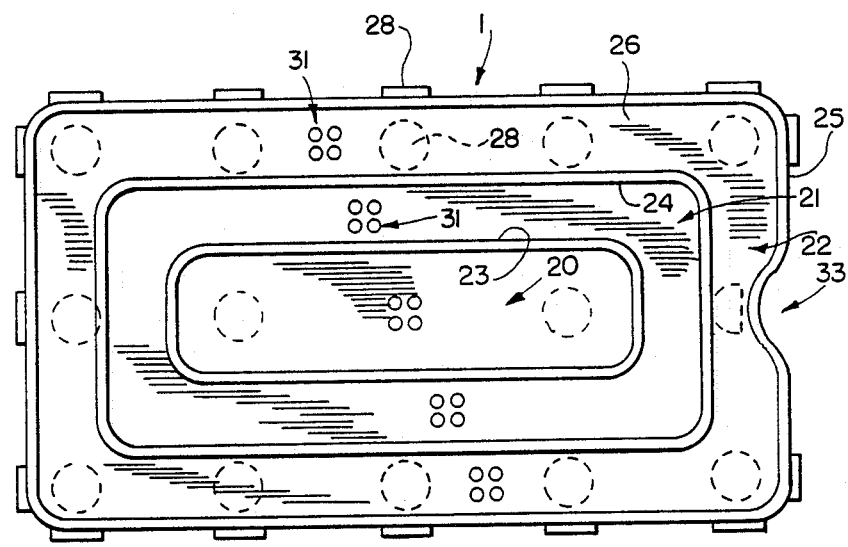
FIG. 4 is a plan view of the bladder with the top removed.

Referring in detail to the drawings, wherein like reference numerals designate like parts in the several figures, and initially to FIG. 1, a bladder 1 according to the present invention is shown installed in a fuel tank 2. The fuel tank has an interior volume 3 in which fuel is stored for use, for example, by an automobile or some other vehicle, and a fill tube 4 through which fuel may be supplied to the tank. A fuel line, a fuel level sensor, fuel pump and/or other conventional devices of that sort also may be included in the tank 2 (and/or in the bladder 1) although they are not shown in the drawing. The tank may be of virtually any shape; as will be appreciated, tanks often are configured according to the space where it will be positioned with respect to a vehicle.

Figure 5:
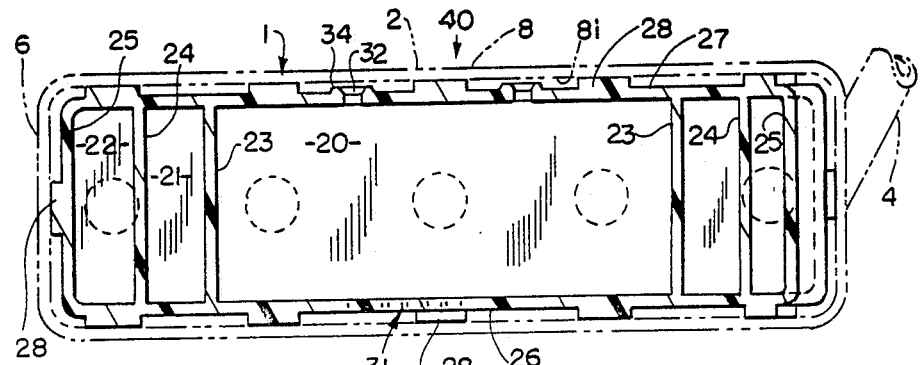
FIG. 5 is a section view of the bladder looking generally in the direction of the arrows 5—5 of FIG. 3.
Figure 6:
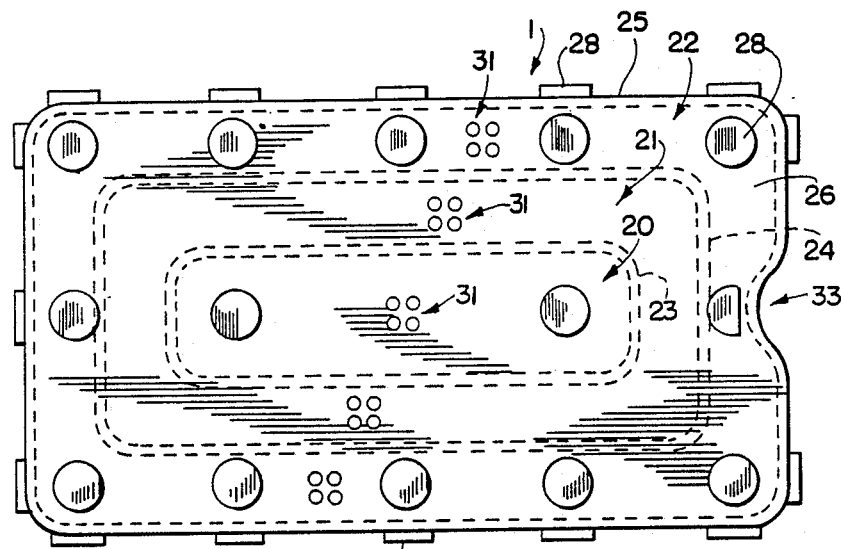
FIG. 6 is a bottom view of the bladder.
Figure 7:
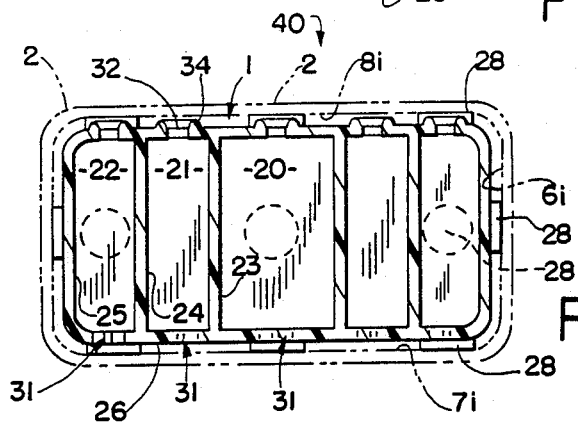
FIG. 7 is a section view of the bladder looking generally in the direction of the arrows 7—7 of FIG. 3.

The tank 2 typically is formed of multiple pieces, usually two, that are welded together along the seam. Such two pieces are designated 2a, 2b, and a weld line at which the two pieces 2a, 2b are welded together is designated 5 in the drawing. The tank 2 has a circumferential side wall 6, a bottom wall 7, and a top wall 8 in the illustrated embodiment. It will be appreciated that the tank also may have various other angled walls, insets, recesses, bulges, deeper and shallower portions, etc., depending on the nature of the specific tank. The bladder 1 would be configured to correspond generally with the shape of the tank. Facing the interior volume 3 of the tank, then, are the inside surfaces 6i, 7i, 8i, respectively, of the side, bottom and top walls of the illustrated tank 1. The inside surface 7i is particularly seen in the section views of FIGS. 5 and 7.

Referring to FIGS. 1 through 7, now, details of the bladder 1 are illustrated and described. The bladder 1 includes a plurality of chambers 20, 21 and 22, for example. Although three chambers are shown, more or fewer may be employed. Moreover, the chambers are illustrated as being generally concentric in the bladder 1, although, if desired, the chambers may be other than concentric. In the illustrated embodiment a plan view cross-section of the chamber 20 is generally rectangular, and the plan view of the chambers 21 and 22 is generally a rectangular annular configuration, as is seen more clearly in FIG. 4. The chambers 20, 21 and 22 are defined along their sides by bladder side walls 23, 24, 25. The wall 25 is the outer wall of the bladder 1. The bottom of the bladder 1 is formed by a bottom wall 26, which also forms a bottom wall for the respective chambers. The top of the bladder 1 is covered by a top wall 27, which also forms a top wall for each of the chambers.

The external dimensions of the bladder 1 are such as to permit the bladder to fit within the volume 3 of the tank 2. The external dimensions of the bladder 1 are such that the bladder fits in relatively close, but spaced apart, relation to the inside walls 6i, 7i, 8i of the tank 2. A plurality of spacers 28 positioned of the outside of the bladder outer wall 25, the bottom of the bottom wall 26 and the top of the top wall 27 help to space the respective bladder walls from the inside surfaces of the correspondingly facing tank walls. The spacers 28 may be integrally formed as part of the respective bladder walls or they may be separate parts that are attached to the respective bladder walls. For example, if the bladder walls are formed of molded plastic, the spacers may be molded as part of the respective walls. Alternatively, the spacers may be separate plastic, rubber or other material parts that are secured to the respective walls of the bladder by fasteners, adhesive, or the like. The spacers 28 on the outer side wall 25 of the bladder are located a distance away from, e.g., above or below, the weld line 5 of the tank 2 so that the heat generated during welding will not detrimentally affect the spacers. The spacers 28 cooperate with the inside walls 6i, 7i, 8i of the tank 2 to assure that a space 30 is provided between such inside walls and the respective correspondingly facing outer walls of the bladder 1. Fuel or air then may flow in that space 30, as may be necessary.

A plurality of holes 31 are provided in the bottom wall 26 of the bladder. The holes 31 provide access for fuel to enter the respective chambers 20, 21, 22 from the bottom. A plurality of vent openings 32 in the top wall 27 of the bladder 1 allow air or other vapor to escape through the top wall as fuel enters respective chambers through the holes 31. An adequate number of holes 31 are formed in the bottom wall 26 and are strategically placed, as may be needed, to assure adequate flow rate of fuel into the respective chambers 20, 21, 22 when the tank 2 is filled by a supply of fuel entering through the fill tube 4. Preferably each chamber 20, 21, 22 has several holes in the bottom wall 26 associated therewith so that the chambers tend to fill at about the same rate. An adequate number of vents 32 are formed in the top wall 27 for each chamber 20, 21, 22 in order to assure an adequate space to vent air, for example, from the chambers during filling so that the chambers fill substantially uniformly through the holes 31. However, if it were desired to cause respective chambers to fill at different rates, the number of holes 31 in the bottom wall and/or vents 32 in the top wall may be varied for respective chambers to tend to alter such relative fill rate. Similarly, the relative drain rate from the chambers 20, 21, 22, i.e., the rate at which fuel is removed from such chambers as it is consumed by an engine to which the tank is coupled, preferably is uniform. However, if desired, the relative drain rate can be altered by changing the relative number of holes 31 and/or vents 32 associated with respective chambers.

A recess 33 is provided in the bladder 1 at the end that faces the fill tube in order to accommodate the space required for the fill tube as it enters the fuel tank 2. The recess may be formed in the outer side wall 25 and in the bottom and top walls 26, 27; if necessary to provide additional space for the fill tube 4, the recess may also be provided in one or more of the other side walls 23, 24 of the bladder 1.

Circumscribing the vent openings 32 in the top wall 27 of the bladder 1 are respective dikes 34, baffles, or the like. The dikes are formed by raised portions of the top wall 27. Alternatively, the dikes 34 may be formed by somewhat resilient material, such as a rubber-type material, a washer, etc., that is adhered to the top wall about the respective end openings 32.

The spacers 28 located at the top, bottom and side of the bladder 1 help prevent the bladder 1 from moving about within the tank 2. Also, the space 30 between the outer walls of the bladder and the inner walls of the tank allows circulation and stabilization of fuel and the release of air, which may have been trapped at the bottom of the tank, to escape to the top for exit from the tank via the conventional vent (not shown). Further, the spacers 28 provide support for the bladder 1 within the tank 2. The fuel contained in the bladder will tend to create internal pressure which tends to urge the walls of the bladder to expand slightly; the spacers 28 maintain the distance between the bladder 1 and tank 2 to provide the space 30. At the top wall 8 the spacers 28 preferably are positioned relatively close to the vent openings 32 to provide maximum stability for the top wall 8 proximate such vent openings 32 so that in particular air may escape through the openings 32 from the various chambers 20, 21, 22.

Preferably, the bladder 1 is made of a non-flammable plastic or other synthetic material. Such material preferably should be resistant to punctures. Moreover, the bladder 1 preferably is flexible so as to deform without breaking during the compressive force encountered in the crash of a vehicle, for example. However, preferably, the bladder 1 is adequately strong so as to resist collapsing in the event such force is encountered.

The bladder 1 may be of virtually any shape suitable to fit in a fuel tank. Preferably the shape of the bladder, i.e., the configuration presented by the top, bottom and side walls thereof, should be approximately the same as the shape of the various walls of the fuel tank so as to fit within the fuel tank and to follow the general shape and form of the inside of the fuel tank. Such design allows maximum containment of fuel and tends to maximize effectiveness of the bladder 1. Some space should be allowed between the inside of the fuel tank and the outside of the bladder, as has been described above, e.g., being provided by the spacers 28 or some other means, to permit circulation of fuel and to release trapped air, as was mentioned above. As the design of a fuel tank may change, so may the design of the bladder 1 to accomplish the various functions described herein. Therefore, it will be appreciated that the actual shape of the bladder, as is illustrated herein, may be varied accordingly.

With the bladder 1 installed in a fuel tank 2, fuel may be delivered to the fuel tank by the fill tube 4. Fuel enters the fuel tank in the conventional manner. The space 33 is large enough to allow the fuel to enter the tank without clogging or blocking fuel and in particular to permit fuel flow to the bottom of the tank so that the tank will tend to fill up the bladder 1 from the bottom to the top. More particularly, fuel entering the tank will tend to flow upward through the openings 31 in the bottom wall 26 of the bladder 1 so as to fill the respective chambers 20, 21, 22 of the bladder. Spacers 28 tend to hold the top wall 27 of the bladder in spaced relation slightly below the interior top wall 8i of the tank. Therefore, air in the chambers 20, 21, 22 of the bladder 1 may escape those chambers via the vent openings 32. The dikes 33 surrounding the vent openings 32 tend to prevent fuel that may splash onto the top wall 27 during filling from flowing down into the vent openings 32 so that the vent openings are kept relatively clear to allow the escape of air therefrom. Note that although the dikes 34 are described as separate pieces of material, such as rubber or the like, circumscribing respective vent openings 32, such dikes may in fact be stamped portions of the material or molded portions of the material of which the top wall 27 of the bladder 1 is formed, thus forming an integral part of such top wall.

The bladder 1 includes plural respective cells or chambers 20, 21, 22 (and possibly more such cells) that are arranged so as to provide one cell within another cell, or one bladder within another. Therefore, respective cells tend to reinforce each other. The concentric nature of the cells facilitate manufacturing and also the reinforcing of one cell by the walls and fluid contained in other cells.

The bladder 1 tends to control sloshing of fuel in a tank and the maintaining of a generally uniform distribution of fuel in the tank. By reducing sloshing and/or agitation and otherwise containing the fuel, less vapor is created. The several chambers and walls separating them act as baffles. After fuel is placed into the fuel tank 2, the holes 31 at the bottom and vent openings 32 at the top as well as the space provided between the bladder and the tank will allow fuel to stabilize to an equal level or equilibrium condition within each of the bladder cells or chambers, and, thus, in the fuel tank 2 overall.

The bladder is formed of synthetic material, such as a plastic material. The various portions thereof may be molded. Parts that would have to be molded separately may be secured to other parts using appropriate adhesive materials. In a preferred embodiment the bladder 1 is formed of Norel plastic and is blow molded. Alternatively, the bladder may be made of metal parts that are secured together by welding or by adhesive material. The bladder may be formed of other materials and methods, as well.

A fuel tank system 40 including the bladder 1 and the tank 2 may be manufactured by placing a bladder 1 in one half of the fuel tank 2 before the other half of the fuel tank 2 is welded to the first. The spacers 28 tend to maintain the bladder generally uniformly centered or spaced relative to the walls of the tank. The two halves of the fuel tank may be welded together at the weld line 5 using conventional welding technique. Preferably the spacers 28 prevent heat damage to the various portions of the bladder 1 during welding by not allowing contact of the bladder 1 and the tank particularly in the weld area. It will be appreciated by those having ordinary skill in the art that other techniques may be employed to manufacture the fuel tank system embodying the various concepts of the present invention.

A primary purpose of the bladder 1 in a fuel tank 2 to form a fuel tank system 40 is to maintain fuel in the tank 1 in a contained and controlled manner, especially during circumstances under which an impact force is applied to the tank, e.g., during a collision, and, more particularly, to provide control of fuel flow in the event of a rupture of the tank as a result of such an impact force form a collision or the like. In a conventional fuel tank without the bladder 1, when a collision occurs, fuel becomes unstable due to the impact and momentum created; fuel is splashed uncontrollably in all directions, thus increasing the chance of fire and/or explosion.

According to the present invention, though, with the bladder 1 in a tank 2 forming a fuel tank system 40, during impact force application to the tank and rupturing of the tank, the bladder 1 tends to contain the fuel by transferring the fuel from a compressed section to an open non-compressed area of the same bladder cell or chamber 20, 21, 22, etc. In the case of severe impact where the fuel tank and the bladder are substantially compressed, fuel still will be controlled. More particularly, the fuel will be displaced primarily through the bottom openings 31 so that the fuel will tend to be displaced in a controlled manner in a direction toward the ground, since the holes 31 are at the bottom of the bladder and tank. The dike walls 34 circumscribing the vent openings 32 will tend to form a seal with the inside surface of the top wall 8i under the force of such impact that would tend to urge the bladder 1 upward in the tank and cause the bladder top wall 27 to deform at areas where there are no spacers 28; and such seal between the dikes 34 and wall 8i will prevent fluid from discharging vertically upwards out from the bladder and subsequently the tank.

By helping to assure that the fuel will be expelled from the bladder vertically downward, the probability of a fire and/or explosion is reduced.

STATEMENT OF INDUSTRIAL APPLICATION

From the foregoing it will be appreciated that the present invention may be utilized in conjunction with a vehicle fuel tank or the like to control the fuel therein, especially in the event of application of a strong impact force to the tank.

The embodiments of the invention in which an exclusive property or privilege are claimed are defined, as follows:

1. A bladder for a fuel tank, comprising means for forming plural concentric chambers separated by respective walls for placement in the fuel tank, spacer means for spacing at least part of an outer wall of the bladder from an inner wall of the fuel tank, opening means for filling respective chambers from the bottom, and vent means for permitting air to exit the respective chambers.

2. The bladder of claim 1, said bottom wall having openings therein to provide for filling of respective chambers from the bottom, and further comprising spacers to space the bottom wall of the bladder from the bottom wall of the fuel tank.

3. The bladder of claim 1, further comprising vent openings in a top wall of the bladder to allow air to escape therefrom.

4. The bladder of claim 3, further comprising seal means for providing a seal at the respective vent openings to tend to block flow of fuel out therefrom.

5. The bladder of claim 4, said seal being operative ordinarily to block flow of fuel into respective chambers from the top.

6. The bladder of claim 4, said seal being operative to block flow of fuel out from respective chambers in the event of deformation of the fuel tank.

7. The bladder of claim 3, further comprising spacer means for spacing the top wall of the bladder from the top wall of the fuel tank.

8. The bladder of claim 1, said means for forming plural concentric chambers comprising plural flexible walls having rigidity to hold shape and flexibility to deform in response to application of impact force thereto.

9. The bladder of claim 1, wherein the means for forming are formed by blow molding.

10. A fuel tank system comprising a fuel tank having an interior volume defined by respective walls, and a bladder in the fuel tank, said bladder including means for forming plural concentric chambers separated by respective bladder walls, spacer means for spacing at least part of an outer wall of the bladder from an inner wall of the fuel tank, opening means for filling respective chambers from the bottom, and vent means for permitting air to exit the respective chambers.

* * * * *